US005119653A

United States Patent [19]

Mazzotta

[11] Patent Number: 5,119,653

[45] Date of Patent: Jun. 9, 1992

[54] KEY LOCK SNAP ASSEMBLY

[76] Inventor: Joseph D. Mazzotta, 186 Ridge Rd., Middletown, Conn. 06457

[21] Appl. No.: 731,545

[22] Filed: Jul. 17, 1991

[51] Int. Cl.[5] ........................ E05B 73/00; F16B 41/00

[52] U.S. Cl. .......................................... 70/58; 70/169; 70/232; 70/404; 70/455; 70/DIG. 34

[58] Field of Search ............................ 70/58, 167–169, 70/DIG. 34, 229, 232, 346, 404, 455, 423, 424; 24/673, 674; 292/91

[56] References Cited

U.S. PATENT DOCUMENTS

| | | | |
|---|---|---|---|
| Re. 19,624 | 6/1935 | Kimbell . | |
| 233,060 | 10/1880 | Wright . | |
| 273,729 | 3/1883 | Hanson . | |
| 1,520,975 | 12/1924 | Sterling | 70/346 |
| 1,770,710 | 7/1930 | Prince | 70/168 |
| 1,929,679 | 10/1933 | Duncan | 70/169 |
| 2,311,231 | 2/1943 | Illsche . | |
| 2,937,652 | 5/1960 | Zimmer et al. . | |
| 2,961,725 | 11/1960 | McGee . | |
| 3,386,274 | 6/1968 | McIntyre | 70/232 |
| 3,740,981 | 6/1973 | Patriquin | 70/455 |
| 3,813,904 | 6/1974 | Wallskog | 70/169 |
| 3,918,140 | 11/1975 | Konstant | 29/271 |
| 3,975,803 | 8/1976 | Katayama | 24/217 R |
| 4,092,754 | 6/1978 | Yost . | |
| 4,870,842 | 10/1989 | Plumer | 70/232 |

FOREIGN PATENT DOCUMENTS

| | | | |
|---|---|---|---|
| 933523 | 4/1948 | France | 70/232 |
| 18230 | 9/1893 | United Kingdom | 70/404 |
| 0188295 | 1/1922 | United Kingdom | 24/673 |
| 2212547 | 7/1989 | United Kingdom | 70/58 |

*Primary Examiner*—Lloyd A. Gall

[57] ABSTRACT

A key lock snap assembly for securing fabric covers to a supporting structure has a base member to be mounted on a supporting structure and having a post with a collar intermediate its length. A key lock snap engaged on the base member has a body with a flange adapted to engage with a fabric cover and an upstanding generally cylindrical barrel providing a top wall with a key-receiving aperture therein and a downwardly opening generally cylindrical cavity. Seated in the cavity are a key code having a key passage, a locking element resiliently deflectable about the collar of the post and engageable with the post, and a rotatable lock in the barrel which will engage the locking element in its position engaging the post below the collar, and this precludes deflection of the locking element about the collar. A key is insertable into the aperture of the top wall of the body and through the aperture of code element into the lock to effect its rotation. When the lock is in one position, it allows the snap to be snapped onto or removed from the post of the base member; when it is in its other position, it locks the locking element on the post to secure the snap on the post.

26 Claims, 5 Drawing Sheets

FIG. 1
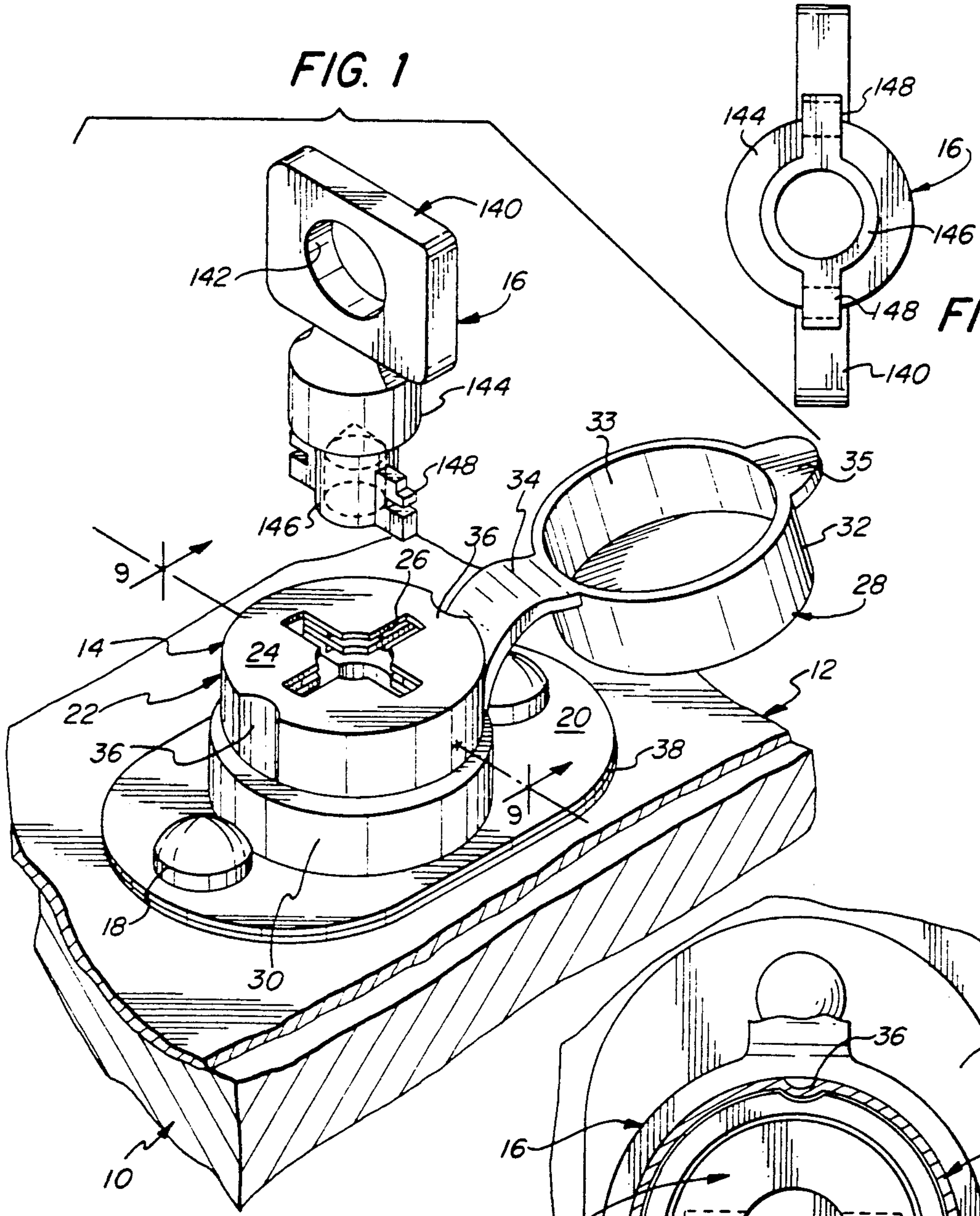
FIG. 2
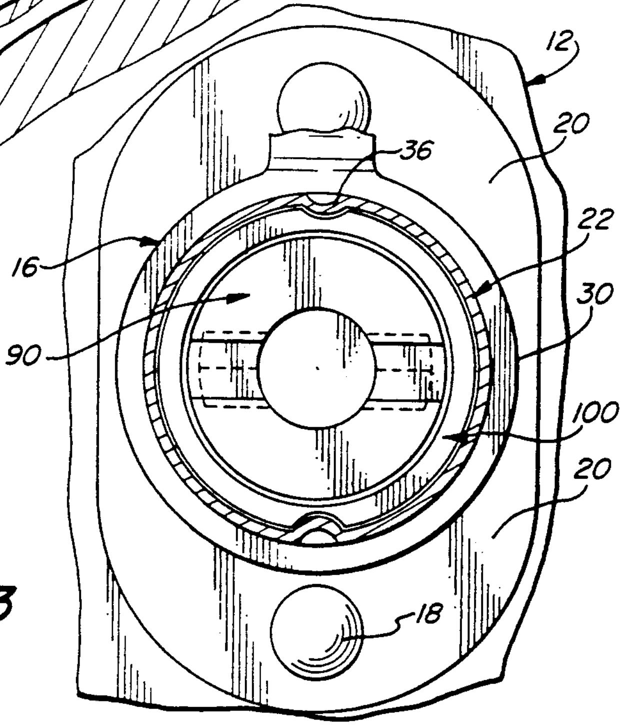
FIG. 3

FIG. 6
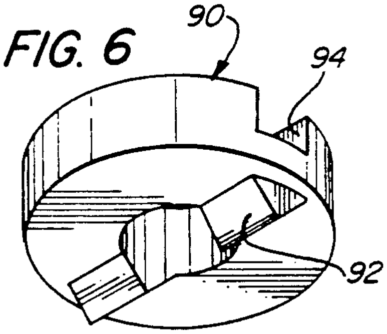
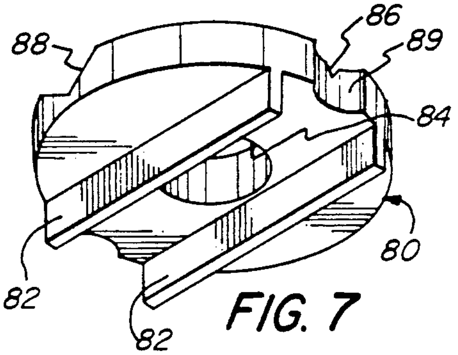
FIG. 7
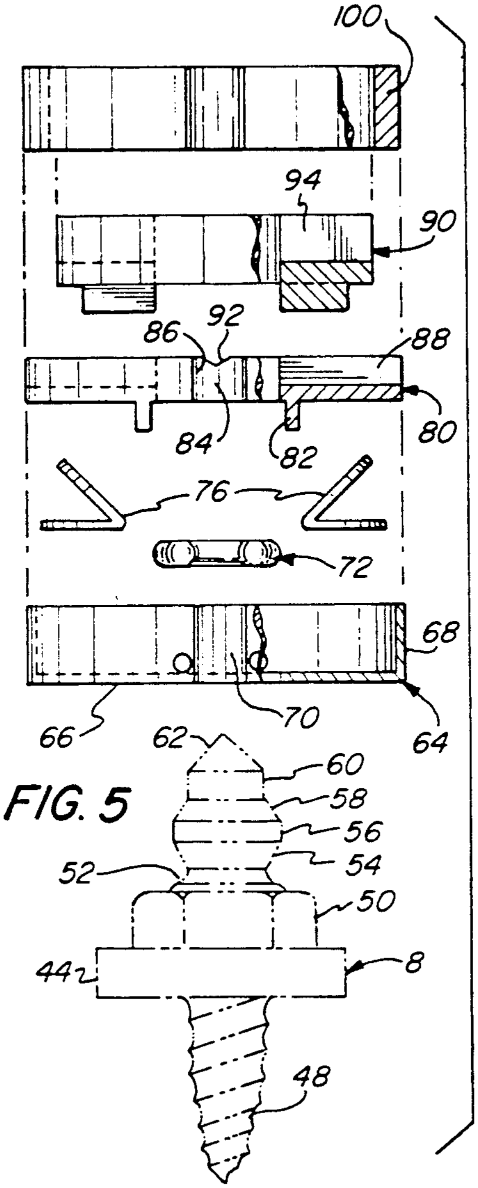
FIG. 5
FIG. 8
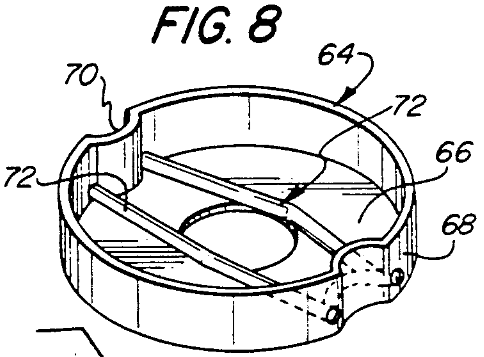
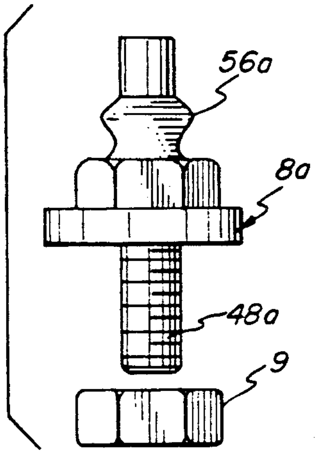
FIG. 11
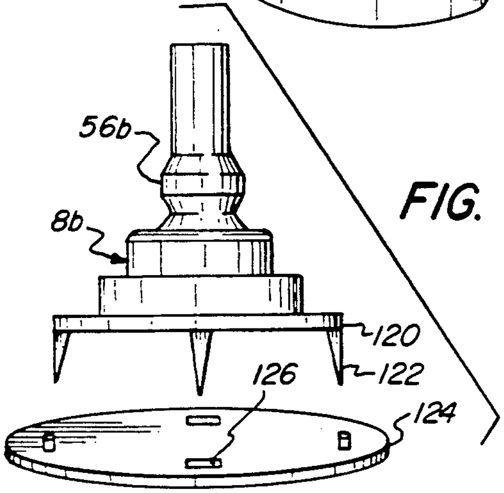
FIG. 12

KEY LOCK SNAP ASSEMBLY

BACKGROUND OF THE INVENTION

The present invention relates to snap fasteners for tarpaulins and like covers and for entry closures for boats, trucks and other structures.

Canvas and synthetic fabric covers or closures of various types are employed to provide covers about or closures for various structures including entry passages, exposed seating areas, storage areas, etc. In some instances, these covers or closures are intended to be removed or opened infrequently so that relatively secure types of attachments may be employed including cables, chains and threaded fastener constructions requiring special tools. However, when the cover or closure is employed over an entrance or seating area to which access is frequently required, it is desirable that it be secured in a manner which permits facile and relatively rapid disengagement from the support structure.

As a result, fabric covers, closures and windbreaks on boats and trucks are generally secured in position by snap fasteners, which terminology is also applied to fasteners which have a head element which is rotatable so that it extends over the grommet in the cover to retain the elements in assembly.

Unfortunately, the desired ease of opening action for the owner or authorized person also benefits a thief or vandal who desires to enter the structure or to gain access to the contents protected by the cover. Although various security devices may be provided in addition to the cover, this will increase cost and may increase the number of operations necessary for the owner to gain access to the contents or to the entrance.

It is an object of the present invention to provide a novel snap fastener for covers and the like which includes a lock which may be readily engaged and disengaged with a small key.

It is also an object to provide such a snap which may be readily assembled to a flexible cover or closure and to the mounting structure.

Another object is to provide such a snap fastener which may be readily assembled from components which may be fabricated relatively easily and economically.

SUMMARY OF THE INVENTION

It has now been found that the foregoing and related objects may be readily attained in a key lock snap assembly for securing fabric covers and closures (hereinafter referred to collectively as "covers") to a supporting structure. The assembly includes a base member with a post having a collar intermediate its length and means thereon for securing the base member to a supporting structure.

A snap is engaged on the base member, and it includes a body with a flange adapted to engage with a fabric cover and an upstanding generally cylindrical barrel having a top wall. The barrel has a key-receiving aperture in its top wall and provides a downwardly opening, generally cylindrical cavity in which is a key code element having a key passage extending coaxially therethrough.

Also seated in the cavity of the barrel is a resiliently deflectable locking element disposed below the code element and resiliently deflectable about the collar of the post and engageable with the post below the collar. Rotatable locking means is disposed in the barrel cavity and is rotatable between a first position engaging the locking element in its position engaging the post below the collar to preclude deflection of the locking element which would enable it to pass upwardly over the collar.

The locking means is movable to a second position in which the locking element is free to resiliently deflect about the collar. A key has a shank insertable into the aperture of the top wall of the body and through the aperture of code element and into the locking means to effect rotation of the locking means between the first and the second positions thereof. When the locking means is in its second position, it allows the snap to be snapped onto or removed from the post of the base member; when it is in its first position, it locks the locking element on the post to secure the snap on the post.

In the preferred embodiment, the locking element comprises a spring having a pair of deflectable, elongated legs engageable about the post. The locking means includes a rotatable engagement member with a pair of ribs engageable with the outer surfaces of the elongated legs in one rotated position to preclude their outward deflection, and it is movable into a second position in which the legs are free from the ribs and are deflectable outwardly about the collar on the post. The locking means includes a rotatable indexing member engageable by the key and engageable with the engagement member to effect its rotation between the first and second positions.

Desirably, the ribs on the engagement member are depending, and the indexing member has a recess in its upper surface in which the shank of the key is engageable. The first and second positions of the engagement member are axially spaced along the post, and the locking means includes biasing means biasing the engagement member into the second position.

In the preferred embodiment, the locking means includes a spring housing in which the locking spring is disposed, and the biasing means comprises an additional spring radially outwardly of the post biasing the engagement member upwardly to space the ribs above the locking spring in its second position. The indexing member has a cam surface engageable with the engagement member to move it between the first and second positions upon rotation of the indexing member. Desirably, the cam surface is a depending boss, and the upper surface of the engagement member has a first recess to seat the boss in the second position of the engagement member and has a second recess which is of lesser depth than the first recess so that the engagement member is depressed into its the first position when the depending boss is moved thereinto.

Preferably, the key and code element are cooperatively configured so that the key may be rotated in the barrel relative to the code element. Generally, the code element is comprised of a multiplicity of rings with differently configured apertures therein, and the key has recesses along the length of its shank which are cooperatively configured to permit its rotation within the ring apertures from a first position to a second position. The snap includes means retaining the rings against rotation in the barrel, and the key shank has an axially extending passage therein adapted to receive the post of the base member.

In the preferred constructions, the snap includes a cap having a recess to receive the upper end of the barrel and provide a closure therefor, a retaining ring engageable about the barrel, and a connecting strap to the cap to retain the cap in assembly therewith upon removal from the upper end of the barrel. The base member has a spacer portion below the collar on the post to provide spacing between the snap and the associated supporting structure Desirably, the collar of the post has upper and lower inclined surfaces to facilitate deflection of the locking element thereabout.

BRIEF DESCRIPTION OF THE DRAWINGS

FIG. 1 is a perspective view of a snap fastener assembly embodying the present invention as employed in an installation to secure a fragmentarily illustrated fabric cover upon a fragmentarily illustrated wooden support structure and with its protective cap in its open position and the key shown disposed thereabove;

FIG. 2 is a bottom view of the key of FIG. 1;

FIG. 3 is a sectional view along the line 3—3 of FIG. 9;

FIG. 5 is an exploded side elevational view in partial section of the parts of the internal post engaging mechanism of the snap and also showing the post in phantom line;

FIG. 6 is a bottom perspective view of the index plate;

FIG. 7 is a bottom perspective view of the spring plate;

FIG. 8 is a top perspective view of the lock spring housing with the lock spring assembled therein;

FIG. 11 is a partially exploded view of an alternate post construction;

FIG. 12 is a partially exploded view of another post construction;

DETAILED DESCRIPTION OF THE PREFERRED EMBODIMENT

Figure 4:
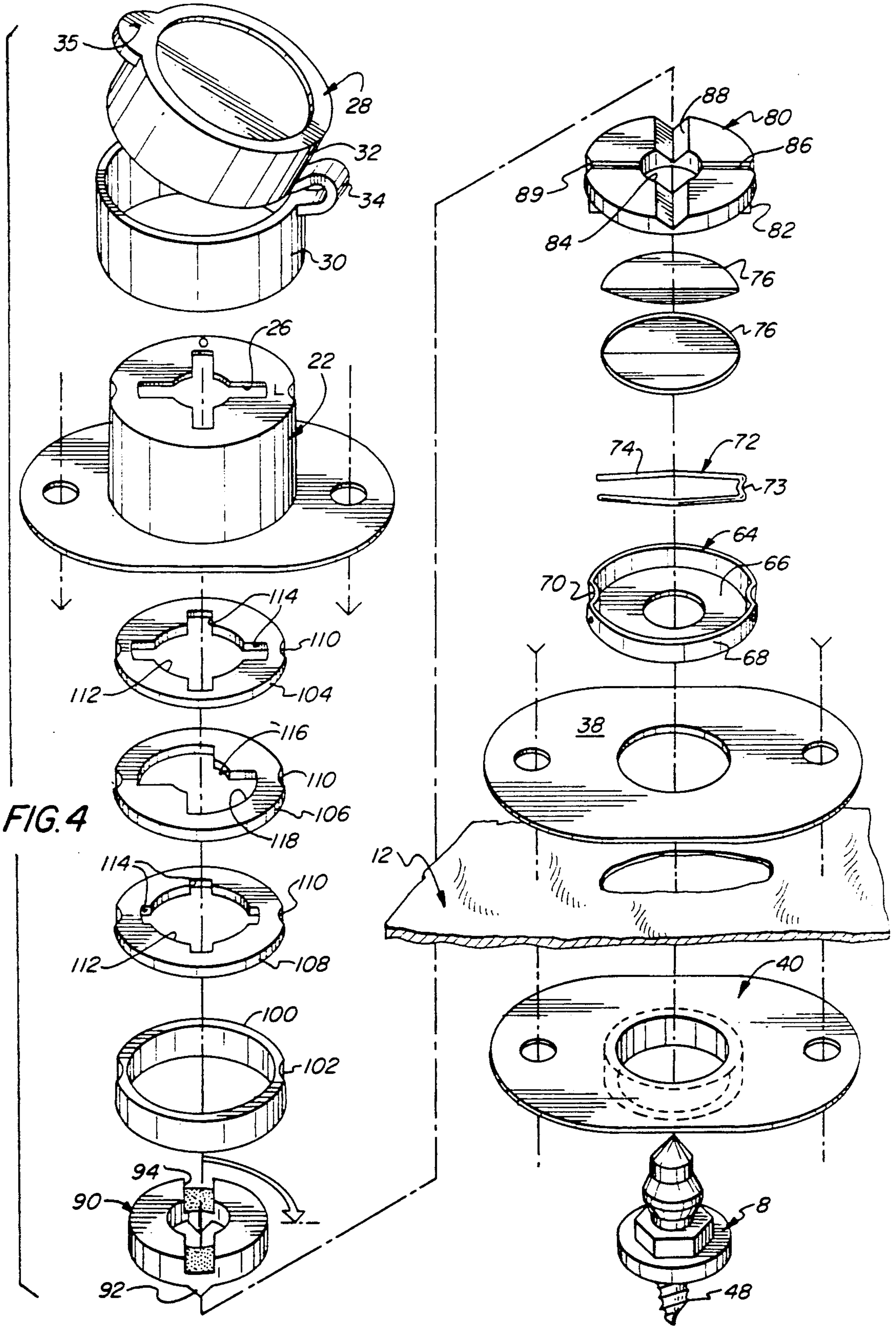
FIG. 4 is an exploded view of the snap fastener of FIG. 1 and with a fabric cover fragmentarily illustrated.

Turning first to FIG. 1, therein fragmentarily illustrated is a snap fastener installation embodying the present invention in which the post (not shown) is mounted upon a wooden support structure generally designated by the numeral 10 and its snap component generally designated by the numeral 14 is mounted upon a fabric cover generally designated by the numeral 12. The snap component 14 is operable by a key generally designated by the numeral 16 which is insertable into the cruciform aperture 26 in the top wall 24 of the inverted barrel generally designated by the numeral 22.

In this embodiment, the barrel 22 is formed integrally with a peripheral flange 20 and it has a pair of diametrically opposed axially extending indentations 36. The flange 20 of the barrel 22 is seated on a top mounting plate 38 which is coextensive therewith, and rivets 18 extend through apertures in the flange 20 and mounting plate 38, the fabric 12 and a bottom mounting plate 40 which is seen in FIG. 4. Extending about the barrel 22 adjacent its flange 20 is the ring 30 of the cap generally designated by the numeral 28, and the strap 34 provides a flexible connection between the ring 30 and the closure 32 which provides a recess 33 into which the upper portion of the barrel 22 securely seats. To facilitate lifting the closure portion 32 from the barrel 22, the tab 35 projects from its periphery for facile engagement by the fingers of the user.

Figure 9:
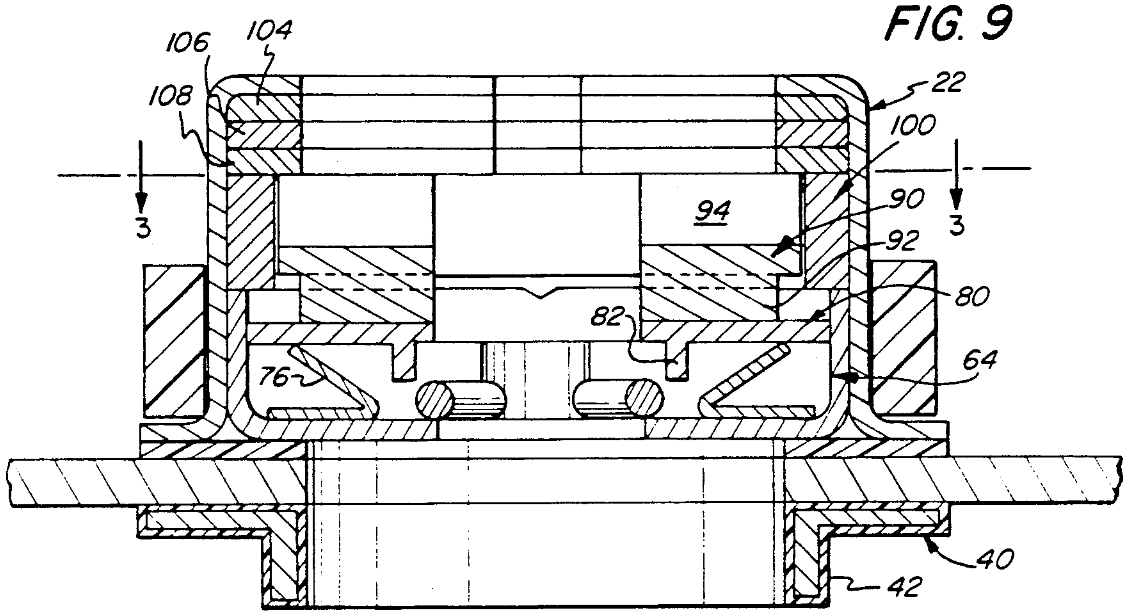
FIG. 9 is a sectional view to an enlarged scale of the snap of FIG. 1 along the line 9—9 of FIG. 1, with its cap removed, the snap disengaged from the post, and the locking mechanism disengaged.
Figure 10:
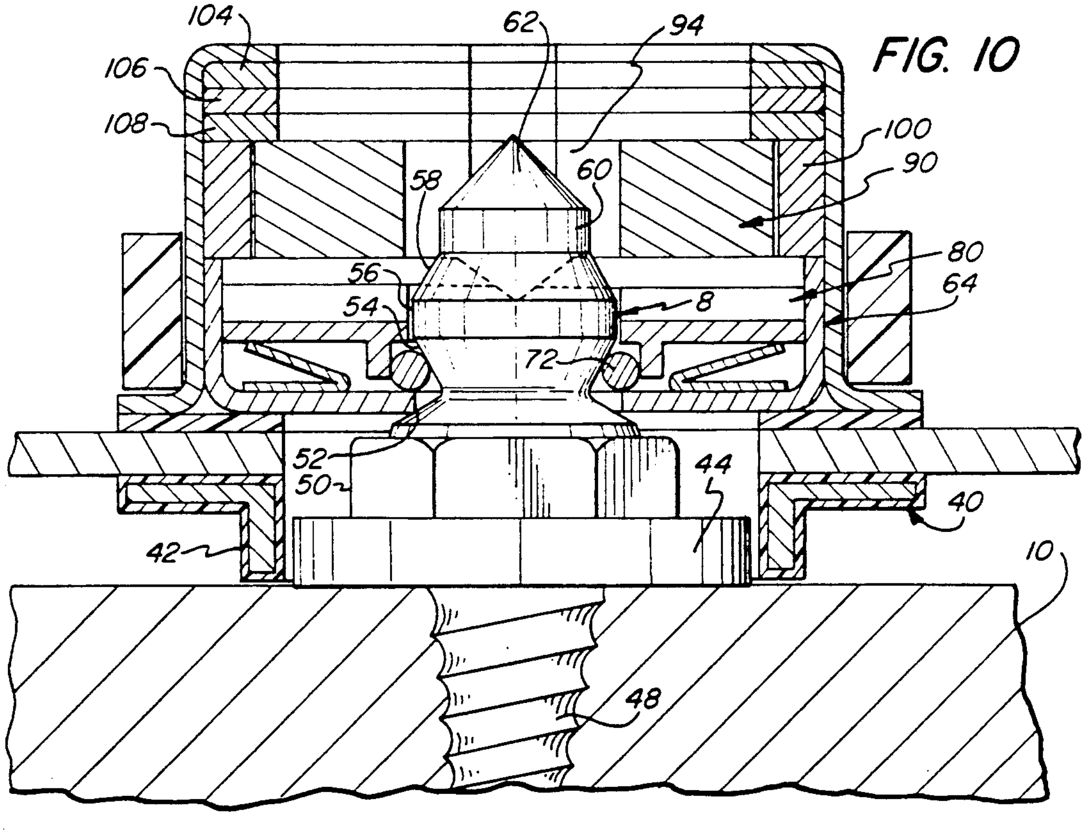
FIG. 10 is a similar view of the snap as assembled upon the post and with the locking mechanism rotated into the locking position.

As seen in FIGS. 9 and 10, the bottom mounting plate 40 has a depending cylindrical wall 42 which seats about the cylindrical base 44 of the mounting post which is generally designated by the numeral 8, and it has a screw threaded shank portion 48 which is threadably engaged in the wooden support structure 10. Immediately adjacent the upper surface of the base 44 is a spacer portion 50 of lesser dimension, and from its upper surface projects the pin portion which is initially contoured with an upwardly and inwardly inclined portion 52, followed by an upwardly and outwardly inclined surface portion 54 to the substantially uniform diameter collar 56. Above the collar 56 are the upwardly and inwardly tapering surface 58 and the tip portion 60 with its conical tip 62.

Seated within the barrel 22 are a series of components for locking of the snap 14 on the post 8, and reference should be made concurrently to FIGS. 4 through 10 to understand the structure and the operation of the locking elements. At the base of the assembly within the barrel 22 is the cup-shaped lock spring housing generally designated by the numeral 64 which has an annular base wall 66 and a peripheral wall 68 with diametrically opposed arcuate indentations 70 which slidably seat on the indentations 36 of the barrel 22. Seated in the lock spring housing 64 is the generally U-shaped lock spring generally designated by the numeral 72 which has a bight 73 and a pair of elongated legs 74. As seen in FIG. 8, the bight 73 is formed so that it has spaced shoulders which seat in apertures in the peripheral wall 68 adjacent the indentation 70, and the ends of the legs 74 sit in apertures in the peripheral wall 68 adjacent the opposite indentation 70. The intermediate portions of the legs 74 extend through marginal portions of the central aperture.

As best seen in FIGS. 9 and 10, a pair of V-shaped compression springs 76 are also seated in the lock spring housing 64 to either side of the legs 74 of the lock spring 72.

Vertically slidable along the inside surface of the peripheral wall 68 of the lock spring housing 64 is the spring lock plate generally designated by the numeral 80, and it has a pair of depending secantly extending ribs 82 located on opposite sides of the aperture 84 extending therethrough. In its top surface, the spring lock plate 80 has a first diametrically extending groove 86 of relatively narrow width and depth and a second diametrically extending groove 88 which is perpendicular thereto and which is of considerably greater width and depth. In its circumference, it has a pair of diametrically spaced arcuate recesses 89 between the ribs 82 which slidably seat on the indentations 36.

Disposed upon the top of the spring lock plate 80 is the index plate generally designated by the numeral 90, and it has a depending diametrically extending rib 92 on its lower surface of inverted triangular cross section. In its top surface, the index plate 90 has a diametrically extending groove 94.

Extending about the periphery of the index plate 90 is an annular spacer or ring 100 which has a pair of diametrically spaced arcuate recesses 102 in its outer periphery which register with the indentations 36 in the barrel 22, and the index plate 90 is slidable therewithin.

Sitting on top of the spacer 100 and trapped between it and the top wall 24 of the barrel 22 are a series of three code rings 104, 106 and 108 each having diametrically spaced recesses 110 in the circumference thereof which seat the barrel indentations 36. The upper and lower rings 104 and 108 have generally circular apertures 112 extending therethrough with generally rectangular wing extensions 114 spaced 90° apart. The intermediate code ring 106 has an aperture 116 which is elongate with a pair of diametrically spaced wedge or fan shaped portions 118.

As can be seen, the arcuate recesses in the periphery of the several elements 64, 80, 90, 100, 104, 106 and 108 allows each of these elements to be securely positioned within the barrel 22 and precluded from relative rotation by the indentations 36 which extend thereinto. However, vertical and rotational movement of the index plate 90 is permitted as is vertical movement of the spring lock plate 80.

After assembly of all the elements into the barrel 22, the flange 20 is secured to the top mounting plate 38 to lock all the members therein, and this may be done by riveting, staking or tack welding, or adhesives may be employed if so desired. The ring 30 of the cap 28 may be telescopically fitted over the exterior of the barrel 22 at any time including after assembly to the fabric cover 12.

Turning now in detail to the key 16, it can be seen that it has the finger grip portion 140 with an aperture 142 extending therethrough to facilitate its mounting upon a chain or the like (not shown) and a shank portion 144. Depending therefrom is a tubular lock portion 146 dimensioned to fit into the circular central portion of the cruciform aperture 26 in the top wall 24 of the barrel 22 and to extend through the apertures 112, 116 in the lock rings 104, 106 and 108. Extending radially outwardly therefrom at diametrically spaced positions are a pair of wing portions 148 which are dimensioned and configured to extend through the cruciform portions of the aperture 26 and to be rotatable through an arc of 90° within the apertures 112 and 118 of the code rings 104, 106 and 108.

To effect locking and unlocking of the snap from the post, the key 16 is inserted into the cruciform aperture 24 of the barrel 22. As will be appreciated, the upper portion of the post 8 extends into the base of the tubular lock portion 146 of the key. Assuming that it is properly configured for the particular snap, the wing portions 148 will pass downwardly through the code rings 104, 106 and 108 until the lowermost ends of the wing portions 148 seats in the diametrical recess 94 of the index plate 90. The key 16 may be rotated and the wing portions 148 are dimensioned and configured for the apertures 112-118 of code rings 104, 106 and 108 so that they will freely rotate therein through an arc of 90° and thus cause rotation of the index plate 90° through an arc of 90°.

As can be seen in FIG. 9, the index plate 90 in the unlocked position has its depending rib 92 seated in the relatively deep and wide groove 88 of the spring plate 80 so that the spring plate 80 is biased upwardly by the springs 76 into an upward position.

Upon rotation of the key 16 and index plate 90 through the 90° arc, the rib 92 exits from the large groove 88 of the spring lock plate 80, causing it to be pushed downwardly. It then seats in the narrower and shallower groove 86 in the position seen in FIG. 10 in which its depending ribs 82 are disposed on opposite sides of the legs 74 of the lock spring 72 to preclude them from deflecting outwardly and to trap them against the tapered surface 54 and under the large diameter collar 56. This locks the post 8 into the snap 14 and precludes disassembly.

When it is desired to disengage the cover 12 from the support structure 10, the key 16 may be inserted into the snap 14 and rotated 90° from the locked position and this will allow the spring plate 80 to again move upwardly under the action of the springs 76, releasing the legs 74 of the spring 72 so that they can be cammed apart by the outwardly tapering surface 54 as the cover 12 is lifted upwardly. The legs 74 will pass by the large diameter collar 56 so that the snap 14 may be removed from the post 8.

In FIG. 11, there is illustrated another embodiment of post 8*a* which has a shank 48*a* with a machine screw configuration, and it is adapted to be secured by the nut 9 to a support structure (not shown) through which the shank 48*a* passes. It can be seen that the upstanding portion of this post 8*a* still provides the double tapered portion providing a large diameter collar 56*a* which will preclude vertical movement of the legs of the spring 72 thereby.

In FIG. 12, there is illustrated still another embodiment of post 8*b* which has a base 120 with four depending prongs 122 adapted to pierce a heavy fabric or plastic support (not shown) to which the post 8*b* is attached and to extend through apertures 126 in the mounting plate 124 which is disposed on the opposite side of the fabric support. The projecting end of the prongs 122 are bent therebehind to effect the assembly. There are specific differences in the upwardly extending portion of the post, but it provides the necessary tapered portion and circumferential shoulder 56*b* to retain the lock spring 72 from vertical movement thereby.

Figure 13:
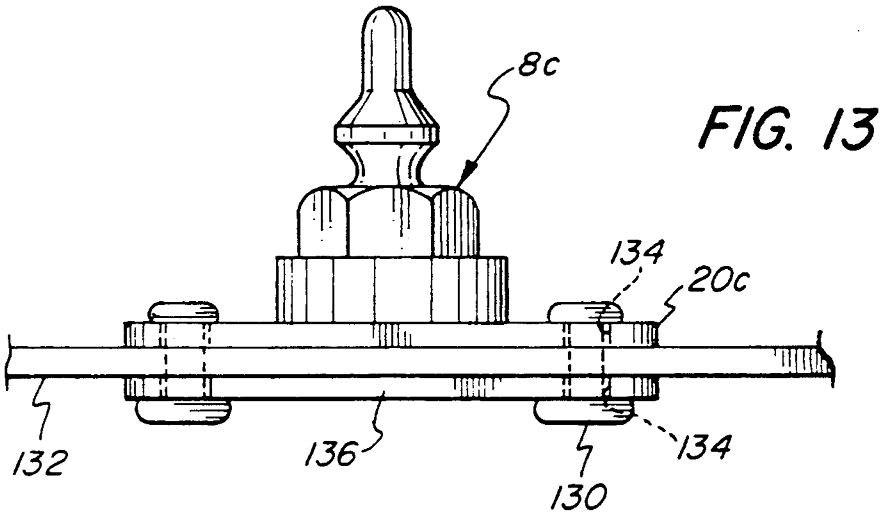
FIG. 13 is a fragmentary side elevational view of another type of post assembly as mounted on a fragmentarily illustrated fabric cover.
Figure 14:
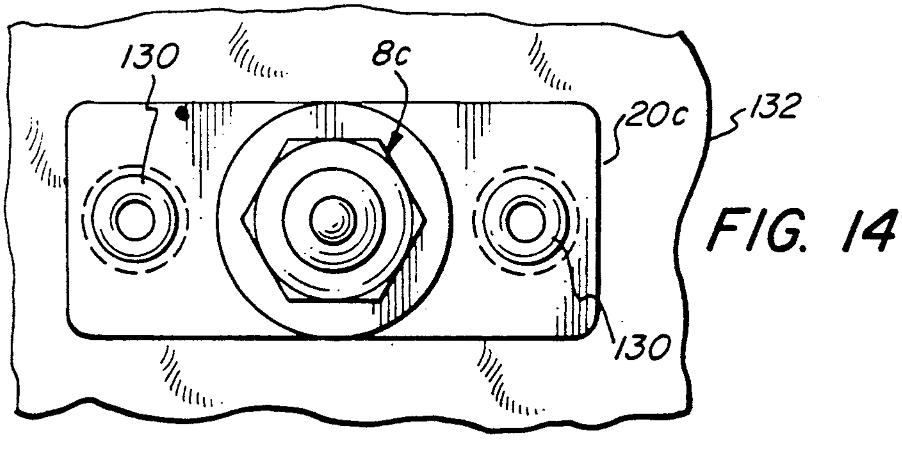
FIG. 14 is a top plan view thereof.

Turning now to FIGS. 13 and 14, a further embodiment of post 8*c* is shown. Here the post 8*c* has an elongated flange 20*c* with apertures 134 therein. Rivets 130 extend through these apertures 134 and through apertures in the heavy fabric or plastic support 132 and thence through apertures 134 in a cooperating bottom mounting plate 136 to secure the post 8*c* in position on the support 132. The upstanding portion of the post 8*c* is generally similar in configuration to that seen in FIGS. 1-10.

It will be appreciated that the snap assembly of the present invention may be readily employed in various combinations of cover and support structures, such as covers for boat cockpits, entryways into various structures, covers over storage areas such as truck beds, etc. The type of post employed will depend upon the support structure, i.e., whether it is wood, metal, plastic or heavy fabric, and several different embodiments of posts adapted to the various types of material are illustrated in the attached drawings.

The snap is easily assembled to the fabric cover, although some care should be taken when piercing the fabric for the fastening elements and also to provide the aperture to permit the post to pass therethrough. Obviously, the two elements should be properly aligned, and this may be done conveniently by first assembling the posts to the support structure and then laying the cover thereover and marking the points where the fabric cover should be pierced. These markings can then be utilized to effect the alignment of the snaps thereon.

It will be appreciated that many modifications can be made in the structure illustrated in the attached drawings without departing from the spirit of the present invention. For example, other biasing spring elements for the spring lock plate may be employed, the number of code rings can be increased or decreased, and their configuration can be varied. Other types of key code devices may be substituted for the index rings, although this may have the effect of increasing costs.

In the illustrated embodiment, it will be noted that the post provides a structure which will elevate the snap above this support structure so as to allow air to pass thereabout. If so desired, the post assembly and the snap may be modified so that the cover fits fairly tightly against the surface of the support structure. To extend the life of the assembly and avoid entry of contaminants, the plastic cap is provided and its closure should be engaged on the barrel to seal the cruciform aperture therein when the cover is in place and locked and/or when the cover is removed and folded back.

The configuration of the various elements is relatively simple, and the metal parts can be formed readily. Stamping of sheet metal may be used for some parts although casting, molding or machining may be required for other parts. In addition to metal, they may also be formed from durable and rugged synthetic resins such as engineering grade resins. The spring lock plate and index plate contours and projections such as the ribs on the index plate and spring lock plate generally favor the use of casting, molding or metal sintering techniques to produce these components. The posts are conveniently machined from rod stock so as to provide a high strength integral structure.

Although other metals may be employed, corrosion resistance is a desirable characteristic for the snap assembly so as to provide long life, and stainless steel and like materials are preferred.

Thus, it can be seen from the foregoing detailed specification and attached drawings that the snap assembly of the present invention is one which permits secure engagement of the cover to a support structure, and yet enables facile locking and unlocking of the snap assembly and thereby securing and opening of the cover. The components of the assembly may be readily and relatively economically fabricated and assembled, and the assembly will exhibit long life in a marine environment.

Having thus described the invention, what is claimed is:

1. A key lock snap assembly for securing fabric covers to a supporting structure comprising:

(a) a base member having a post with a collar intermediate its length and means for securing said base member to a supporting structure;

(b) a key lock snap engaged on said base member and including (i) a body with a flange adapted to engage with a fabric cover and an upstanding generally cylindrical barrel having a top wall with a key-receiving aperture therein and providing a downwardly opening generally cylindrical cavity;

(ii) a key code element seated in said cavity and having a key passage extending coaxially therethrough;

(iii) a resiliently deflectable locking element in said barrel below said code element and resiliently deflectable about said collar of said post and engageable with said p st below said collar;

(iv) rotatable locking means in said barrel rotatable between a first position engaging said locking element in its position engaging said post below said collar, said locking means precluding deflection of said locking element to pass upwardly over said collar and a second position in which said locking element is free to resiliently deflect about said collar; and (v) a key having a shank insertable into said aperture of said top wall of said body and through said code element passage into said locking means to effect rotation of said locking means between said first and said second positions thereof, said locking means, when in said second position, allowing said snap to be snapped onto or removed from said post of said base member, when in said first position, locking said locking element on said post to secure said snap on said post.

2. The key lock snap assembly in accordance with claim 1 wherein said locking element comprises a spring having a pair of deflectable, elongated legs engageable about said post.

3. The key lock snap assembly in accordance with claim 2 wherein said locking means includes an engagement member with a pair of ribs engageable with the outer surfaces of said elongated legs in one position to preclude their outward deflection and movable into a second position in which said legs are free from said ribs and are deflectable outwardly about said collar on said post.

4. The key lock snap assembly in accordance with claim 3 wherein said locking means includes a rotatable indexing member engageable by said key and engageable with said engagement member to effect its movement between said first and second positions.

5. The key lock snap assembly in accordance with claim 4 wherein said ribs on said engagement member are depending and wherein said indexing member has a recess in its upper surface in which said shank of said key is engageable.

6. The key lock snap assembly in accordance with claim 5 wherein said first and second positions of said engagement member are axially spaced along said post.

7. The key lock snap assembly in accordance with claim 6 wherein said locking means includes biasing means biasing said engagement member into said second position.

8. The key lock snap assembly in accordance with claim 7 wherein said locking means includes a spring housing in which said locking spring is disposed, and wherein said biasing means comprises an additional spring radially outwardly of said post biasing said engagement member upwardly to space said ribs above said locking spring in said second position thereof.

9. The key lock snap assembly in accordance with claim 4 wherein said indexing member has a cam surface engageable with said engagement member to move it between said first and second positions upon rotation of said indexing member.

10. The key lock snap assembly in accordance with claim 9 wherein said cam surface is a depending boss and wherein the upper surface of said engagement member has a recess to seat said boss in said second position of said engagement member.

11. The key lock snap assembly in accordance with claim 10 wherein said engagement member has a second recess in its upper surface which is of lesser depth than said first recess so that said engagement member is depressed into its said first position when said depending boss is moved thereinto.

12. The key lock snap assembly in accordance with claim 1 wherein said key and code element are cooperatively configured so that said key may be rotated in said barrel relative to said code element.

13. The key lock snap assembly in accordance with claim 12 wherein said code element is a multiplicity of rings with differently configured apertures therein and wherein said key has recesses along the length of its shank which are cooperatively configured to permit its rotation within said ring apertures from a first position to a second position, and wherein said snap includes means retaining said rings against rotation in said barrel.

14. The key lock snap assembly in accordance with claim 1 wherein said key shank has an axially extending passage therein adapted to receive said post of said base member.

15. The key lock snap assembly in accordance with claim 1 wherein said snap includes a cap having a recess to receive the upper end of said barrel and provide a closure therefor.

16. The key lock snap assembly in accordance with claim 15 wherein said snap includes a retaining ring engageable about said barrel and a connecting strap to said cap to retain said cap in assembly therewith upon removal from the upper end of said barrel.

17. The key lock snap assembly in accordance with claim 1 wherein said base member has a spacer portion below said collar on said post to provide spacing between the snap and the associated supporting structure.

18. The key lock snap assembly in accordance with claim 1 wherein said collar of said post has upper and lower inclined surfaces.

19. A key lock snap assembly for securing fabric covers to a supporting structure comprising:

(a) a base member having a post with a collar intermediate its length and means for securing said base member to a supporting structure;

(b) a key lock snap engaged on said base member and including (i) a body with a flange adapted to engage with a fabric cover and an upstanding generally cylindrical barrel having a top wall with a key-receiving aperture therein and providing a downwardly opening generally cylindrical cavity;

(ii) a key code element seated in said cavity and having a key passage extending coaxially therethrough;

(iii) a resiliently deflectable locking element in said barrel below said code element comprising a spring having a pair of deflectable, elongated legs engageable about said post below said collar and resiliently deflectable about said collar of said post;

(iv) rotatable locking means in said barrel rotatable between a first position engaging said locking element in its position engaging said post below said collar, said locking means precluding deflection of said locking element to pass upwardly over said collar and a second position in which said locking element is free to resiliently deflect about said collar; and (v) a key having a shank insertable into said aperture of said top wall of said body and through said code element passage into said locking means to effect rotation of said locking means between said first and said second positions thereof, said key and code element being cooperatively configured so that said key may be rotated in said barrel relative to said code element, said key shank has an axially extending passage therein adapted to receive said post of said base member, said locking means, when in said second position, allowing said snap to be snapped onto or removed from said post of said base member, when in said first position, locking said locking element on said post to secure said snap on said post.

20. The key lock snap assembly in accordance with claim 19 wherein said locking means includes an engagement member with a pair of ribs engageable with the outer surfaces of said elongated legs in one position to preclude their outward deflection and movable into a second position in which said legs are free from said ribs and are deflectable outwardly about said collar on said post.

21. The key lock snap assembly in accordance with claim 20 wherein said locking means includes a rotatable indexing member engageable by said key and engageable with said engagement member to effect its movement between said first and second positions, and wherein said ribs on said engagement member are depending and said indexing member has a recess in its upper surface in which said shank of said key is engageable, and wherein said first and second positions of said engagement member are axially spaced along said post, and wherein said locking means includes biasing means biasing said engagement member into said second position.

22. The key lock snap assembly in accordance with claim 21 wherein said locking means includes a spring housing in which said locking spring is disposed, and wherein said biasing means comprises an additional spring radially outwardly of said post biasing said engagement member upwardly to space said ribs above said locking spring in said second position thereof.

23. The key lock snap assembly in accordance with claim 22 wherein said indexing member has a cam surface engageable with said engagement member to move it between said first and second positions upon rotation of said indexing member, and wherein said cam surface is a depending boss and wherein the upper surface of said engagement member has a recess to seat said boss in said second position of said engagement member, and wherein said engagement member has a second recess in its upper surface which is of lesser depth than said first recess so that said engagement member is depressed into its said first position when said depending boss is moved thereinto.

24. The key lock snap assembly in accordance with claim 19 wherein said code element comprises a multiplicity of rings with differently configured apertures therein and wherein said key has recesses along the length of its shank which are cooperatively configured to permit its rotation within said ring apertures from a first position to a second position, and wherein said snap includes means retaining said rings against rotation in said barrel.

25. The key lock snap assembly in accordance with claim 19 wherein said snap includes a cap having a recess to receive the upper end of said barrel and provide a closure therefor.

26. The key lock snap assembly in accordance with claim 19 wherein said base member has a spacer portion below said collar on said post to provide spacing between the snap and the associated supporting structure, and wherein said collar of said post has upper and lower inclined surfaces.

* * * * *